United States Patent [19]

Claney et al.

[11] Patent Number: 4,554,943

[45] Date of Patent: Nov. 26, 1985

[54] SINGLE DISC ROTARY VALVE

[75] Inventors: Robert L. Claney; Herbert H. Walton; Steven D. Kehoe; Kimball R. Barron, all of Marshalltown, Iowa

[73] Assignee: Fisher Controls International, Inc., Marshalltown, Iowa

[21] Appl. No.: 557,716

[22] Filed: Dec. 2, 1983

[51] Int. Cl.[4] .............................................. F16K 3/08
[52] U.S. Cl. ................................ 137/242; 137/625.31; 251/175; 251/208
[58] Field of Search ............................ 137/625.31, 242; 251/175, 208

[56] References Cited

U.S. PATENT DOCUMENTS

| | | | |
|---|---|---|---|
| 337,438 | 3/1886 | Royce | 137/242 |
| 1,738,135 | 12/1929 | Bannister | 137/625.31 |
| 3,742,979 | 7/1973 | Woodling | 251/175 X |
| 4,429,717 | 2/1984 | Montgomery | 137/242 X |

FOREIGN PATENT DOCUMENTS 1103097  3/1961  Fed. Rep. of Germany ..................... 137/625.31

Primary Examiner—Arnold Rosenthal
Attorney, Agent, or Firm—Dale A. Kubly; Nicholas A. Camasto

[57] ABSTRACT

A bidirectional rotary valve capable of use in high pressure flowpaths includes a pair of removable end retainers defining aligned ports and having a single rotatably mounted disc closely positioned therebetween. The disc has ports corresponding to those of the end retainers and is operated by link means coupled to an operating rod slidably mounted in the valve body. Rotation of the disc changes the alignment between its ports and those in the end retainers for controlling flow. The disc is loosely mounted on a bearing pin that is also loosely fitted in the end retainers to permit slight lateral movement of the disc and ready disassembly of the valve. The disc is constructed such that it will flex to a greater degree for a given pressure than the end retainers.

3 Claims, 7 Drawing Figures

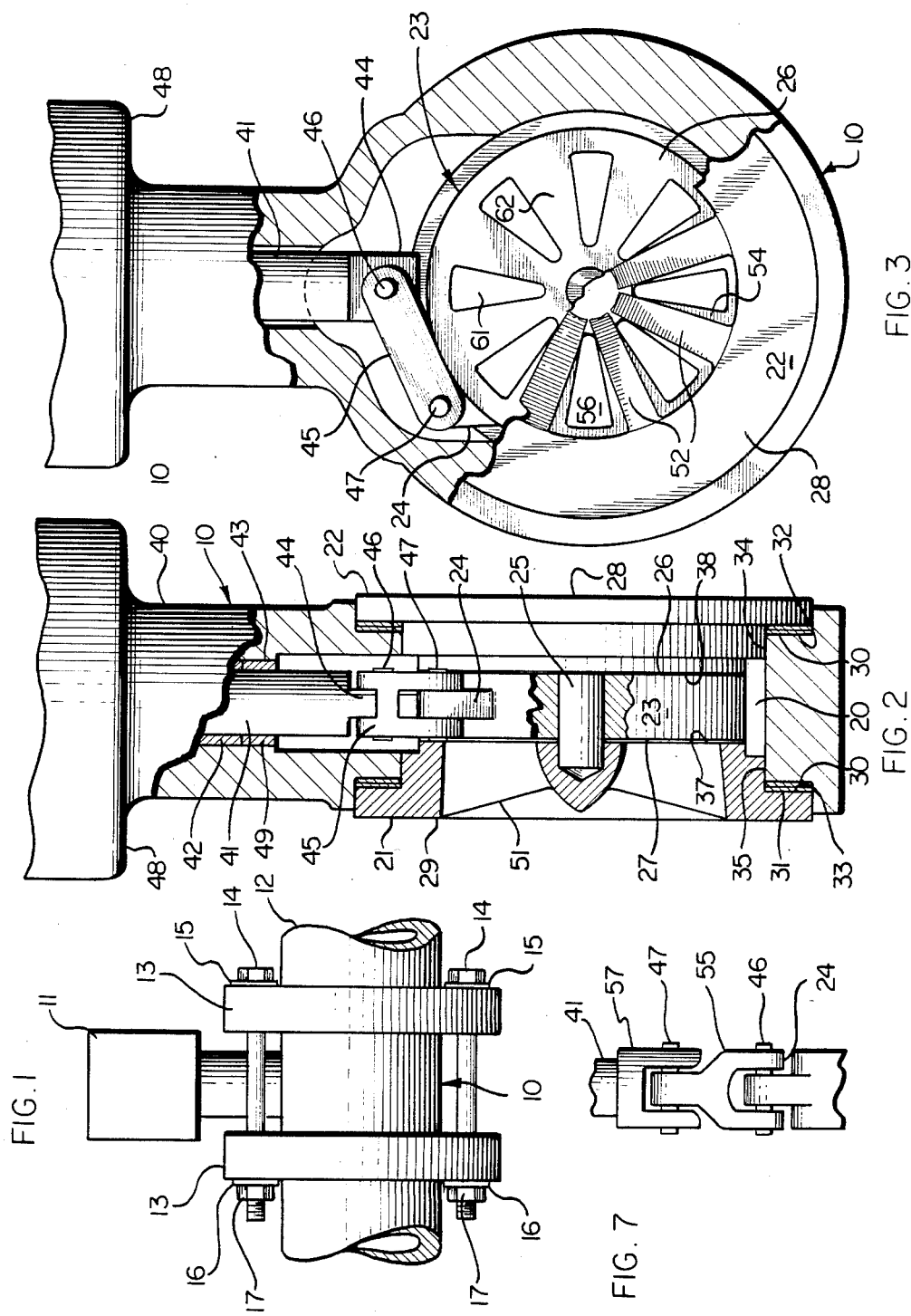

(ON)

(OFF)

SINGLE DISC ROTARY VALVE

BACKGROUND OF THE INVENTION AND PRIOR ART

This invention relates generally to fluid control valves and particularly to fluid control valves of the throttling type.

Throttling type fluid control valves are characterized by an ability to precisely control flow through flow openings or ports which are generally adjustable in size. Such valves may be suitable for high pressure or low pressure use or for use with caustic fluids, gases, etc. The present invention is directed to a rotary disc throttling control valve which exhibits precise flow control, is suitable for use in high pressure flowpaths, exhibits high operating efficiency, that is, does not substantially impede fluid flow when in the open or "on" position and does not leak when in the closed or "off" position.

The throttling control valve of the present invention is of the movable disc type and includes a single, flat, highly polished, ported rotatable disc positioned between fixed end retainers having corresponding ports. Rotation of the disc relative to the end retainers varies the areas of the ports in the flowpath and thus controls fluid flow. There are different types of throttling disc valves in the prior art. Many are unsuitable for use in high pressure flow lines. Those that are useful with high pressure, generally have a disc operating mechanism situated in the downstream side of the flowpath to vary the size of the port openings and hence to control fluid flow. Such mechanisms are necessarily of heavy construction to withstand the high pressures. One prior art valve includes a stationary disc and a movable disc that is operated by a rotational fork that engages the periphery of the movable disc. The movable disc is on the upstream side of the flowpath. In one version the flowpath turns just downstream of the fork so that the operating mechanism for the fork is not in the flowpath. In another version, an operating handle protrudes from the side of the valve body to permit the operating mechanism to be out of the flowpath. The valves in both versions appear to be massive, quite complicated to manufacture and assemble and quite expensive Most prior art rotary disc type throttling valves for high pressure applications are also unidirectional, usually having a stationary disc with a movable disc mounted to the axis thereof. Most use flowpath pressure to help provide a seal and are so constructed as to not be suitable for use in bidirectional flowpaths. They also generally appear to be of very expensive construction.

In a copending application of H. Walton and S. Kehoe, Ser. No. 06/443,704, filed Nov. 22, 1982, entitled "Bidirectional Disc Throttling Valve" and assigned to the present assignee, a pair of machined, relatively adjustable, throttling discs with corresponding ports are supported for both rotational and lateral movement in bearing races in a pair of end retaining rings situated at opposite ends of the flowpath. A toggle link arrangement is used for moving the two discs in opposite angular directions, responsive to vertical movement of an operating stem or rod. A number of seals are provided, which cooperate with the pressure flow to provide a seal between the movable discs and the end retaining ring, depending upon the direction of flow in the flowpath. While the arrangement is generally satisfactory in serving its intended purpose, occasionally high breakout forces are required to move the downstream disc in its bearing race. In some environments this requires the provision of more expensive operating mechanisms. Also, the downstream disc is peripherally supported by the end retaining ring and can experience a greater degree of flexure than the upstream disc which can lead to wear and leakage.

OBJECTS OF THE INVENTION

The principal object of this invention is to provide an improved rotary disc throttling valve.

A further object of this invention is to provide an improved rotary disc throttling valve which is economical to manufacture and capable of use with a wide variety of fluids and gases in high pressure flowpaths.

A still further object of this invention is to provide a rotary disc throttling valve capable of use in bidirectional high pressure flowpaths.

A feature of this invention resides in the ease of reversibility of the disc and its operating linkage to enable a given direction of operating rod motion to either open or close the valve.

SUMMARY OF THE INVENTION

In accordance with the present invention, a throttling valve includes a body defining a cavity, an end retainer in the body defining a port, means for mounting a disc for rotational movement between two angular positions closely adjacent to the end retainer, the disc defining a similar port which, when the disc is in the first of its two angular positions, is in alignment with the port in the end retainer to provide a flowpath therethrough and which, when the disc is in the second in its two angular positions, is in complete alignment with the port in the end retainer to inhibit flow therethrough, operating means outside of the valve body for moving the disc between the two positions and means for sealing the surface between the end retainer and the disc when in its second position.

BRIEF DESCRIPTION OF THE DRAWINGS

Further objects, advantages and features of the invention will be apparent upon reading the following description thereof in conjunction with the drawings in which:

FIG. 1 is a block type representation of the throttling valve of the present invention mounted in a flow line defining a flowpath;

FIG. 2 is a partial sectional side view of a throttling valve in accordance with the present invention;

FIG. 3 is a partial sectional front view of the disc and operating mechanism of a throttling valve in accordance with the present invention;

FIG. 7 is a partial view of a slightly different link configuration.

DESCRIPTION OF THE PREFERRED EMBODIMENT

Figure 4:
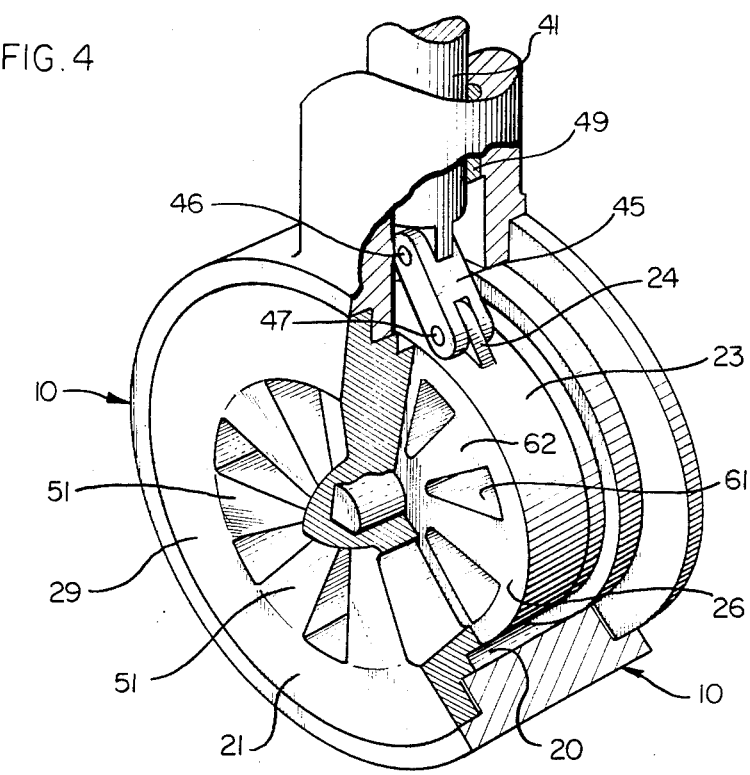
FIG. 4 is a partially broken away perspective view of an assembled valve to better illustrate its operation.

Referring to FIG. 1, a throttling valve 10, actuatable by an actuator 11, is coupled to a pipeline 12 by means of a pair of flanges 13, mounted to the pipeline and held together by a plurality of bolts 14. A washer 15 may be positioned between the head of each bolt and one of the flanges. The fastening, or line bolting as it is commonly referred to, may be completed by means of a suitable lock washer 16 and nut 17 fixed at the end of each bolt 14. It will be appreciated that the illustration is diagrammatic only since the flanges, as well as the means for securing the throttling valve between the flanges, are all conventional and a matter of choice or preference of the designer.

FIG. 2 represents a partial cross section taken through the throttling valve of the present invention illustrating the position and arrangement of the rotatable disc 23 within the body of valve 10, the end retainers 21 and 22 cooperating with the disc and the operating mechanism for producing the desired throttling movement. FIG. 2 may be advantageously considered with the front view of FIG. 3 and the perspective view of FIG. 4 to more readily visualize the construction, arrangement and operation of the valve. Specifically, disc 23 is circular in shape and has a pair of flat, highly polished end faces 26 and 27, including symmetrically arranged ports 61 defined by corresponding vanes 62 therebetween. In the illustrated embodiment, eight such vanes and ports are shown, although a lesser or greater number of ports and vanes may be used as desired or needed. Disc 23 is supported for rotational movement, in a cavity 20 formed in the body, on a cylindrical pin 25, which is relatively loosely held in end retainers 21 and 22. Each end retainer defines a corresponding plurality of vanes 52 and ports 56 radiating outwardly from a central hub. The end retainers are identical and interchangeable. Left end retainer 21 is shown in section in FIG. 2 and includes a flat outer face 29 and a flat inner face 37. The central hub includes a bore 36 in which cylindrical pin 25 is loosely retained. Inner face 37 is also very highly polished since it must sealingly engage end face 27 of disc 23 when flow through cavity 20 is from the right. Similarly, right end retainer 22 includes a flat outer face 28 and a flat, highly polished inner face 38 for cooperation with end face 26 of disc 23.

Cavity 20 is generally cylindrically shaped and end retainers 21 and 22 include intermediate diameter portions 34 and 35 cooperating therewith. A pair of annular recesses in the valve body form shoulders 30 which cooperate with suitable gaskets 31 to seal intermediate faces 32 and 33 of the end retainers. The fit of the end retainers to the valve body is not critical except for the distance between the two inner faces 37 and 38, which must be greater than the thickness of rotatable disc 23. The end retainers may be affixed to the valve in any suitable manner, preferably by a pin and slot arrangement for fixing their rotational position and for simply holding them in position prior to installation of the valve in a pipeline. It should be noted that no retention mechanism is required during operation since the end retainers are compressed between the line flanges, such as flanges 13, shown in FIG. 1. Thus, gaskets 31 are tightly compressed between the shoulders of the body and the intermediate faces of the end retainers to seal the cavity. To simplify installation, the end retainers extend outside the edges of the body forming the cavity so that pressure can be readily brought to bear on them by the line bolting.

Valve body 10 includes a stem or neck 40 having an elongated bore 49 communicating with cavity 20. A mounting flange 48, of any suitable configuration, is provided for mounting an actuator (not shown) to the body. A generally cylindrical operating rod 41 is suitably mounted for linear, reciprocal movement in stem 40 and is surrounded by suitable packing 42 and 43 to seal cavity 20. The end of operating rod 41 has a flat, depending portion 44 which is journalled to receive a cylindrical pin 46 for mounting one end of a generally H-shaped link 45 thereto. The other end of the link is mounted, by a pin 47, to an operating ear 24 formed on the periphery of disc 23.

As best seen in FIG. 3, the valve body is slightly enlarged where it meets the stem to provide clearance for link 45. In this view, right end retainer 22 is partially broken away to reveal disc 23 and link 45 in the "valve on" position. In the "on" position, ports 56 and vanes 52 of right end retainer 22 are substantially aligned with ports 61 and vanes 62 of disc 23. While not visible in this view, the ports and vanes of left end retainer 21 are also aligned. As illustrated by vanes 52, the vanes in the end retainers are tapered inwardly toward the ports to facilitate fluid flow. The hub is somewhat bullet-shaped for the same reason.

It will be appreciated that the throttling valve of the present invention may be readily disassembled for cleaning or servicing. The end retainers are removable to provide access to the body cavity and permit removal of pin 47 and disc 23. Movement of operating rod 41 farther down into the cavity after the disc has been removed enables removal of pin 46 and link 45.

As previously mentioned, disc 23 is rotatably mounted on cylindrical pin 25. The fit is preferably somewhat loose to enable lateral movement of the disc along the pin. The pin is also preferably loosely fitted to the bores of the end retainer hubs to enable ready removal of the end retainers, as described above. While the amount of lateral disc movement is not critical, a minimum of 0.003" (0.76 mm) total clearance between the end faces of disc 23 and the inner faces of the end retainers should be maintained in a 2" valve. The maximum clearance may approach 0.050" (12.7 mm) in an 8" valve. It will be appreciated that, in operation, all of the clearance will be between the upstream side of the rotatable disc and the inner face of the corresponding upstream end retainer. In addition to the contacting face surfaces being flat and highly polished, for maximum sealing efficiency, the edges, where the vanes define the ports, should be sharp to assist in cleaning of these surfaces during rotation of the disc.

The end retainers are preferably thicker than the disc to produce a greater degree of elasticity in the disc. Thus, for a given pressure, the disc will tend to flex more than the end retainers. In operation, this enhances the sealing characteristics of the valve. To illustrate, under pressure, the downstream end retainer will experience a certain amount of flexure. By making the rotatable disc more flexible than the end retainer, it will conform to the flexure of the end retainer and maintain the intimate contact required for cleaning the respective surfaces and forming a leakproof seal. While the actual dimensions will depend upon the valve size and material, this flexure principle should be applied to maximize the benefits of the present invention. The disc surfaces may be coated and polished to a flatness of about one helium light band.

The valve may be constructed for operation in high temperature environments, with high pressure flows and with caustic fluids. The body may be constructed of a suitable material such as WCB or 316 stainless steel. In suitable environments special TFE seats may be used.

Figure 5:
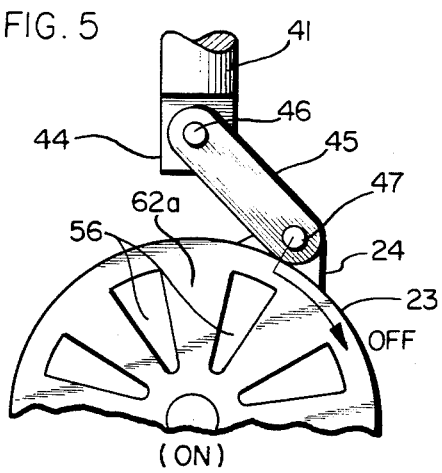
FIG. 5 is a partial view of the operating ear and link configuration showing one position of the operating rod resulting in a valve on condition.
Figure 6:
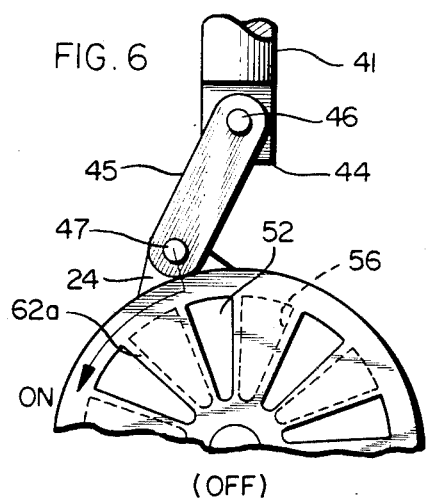
FIG. 6 is a partial view similar to that of FIG. 5, showing the same position of the operating rod resulting in a valve off condition.

Not only is the disc valve of the present invention suitable for use in bidirectional flowpaths, it is also readily changeable for operation in either the "push down to open" or "push down to close" modes. Thus either an "on" or "off" valve condition may be selected by proper positioning of the rotatable disc and the link during assembly of the valve. This is clearly illustrated in FIGS. 5 and 6. For example, assume an operating rod movement from "valve on" (open) to "valve off" (closed) that results in approximately a 30° rotation of the disc. By locating the operating ear of the disc and the link to the right as shown in FIG. 5, or to the left as shown in FIG. 6, operation of the valve for a given operating rod position will be reversed. FIG. 5 represents the "on" position of the valve with operating rod 41 down. In response to upward movement of rod 41, disc 23 will rotate counterclockwise to close the valve as indicated by the arrow labelled OFF. As shown, vane 62a of rotatable disc 23 is positioned to the right, with reference 56 indicating the ports in the end retainer behind disc 23. During assembly, link 45 and ear 24 need merely be positioned to the left, as illustrated in FIG. 6, to change the relative rotation direction of disc 23 for a given direction of operating rod movement.

FIG. 6 illustrates a "valve off" condition, with operating rod 41 down. Upward movement of the rod rotates disc 23 clockwise to open the valve as indicated by the arrow labelled ON. It is seen that vane 62a of disc 23 is positioned to the left and now covers port 56 (shown in dashed lines) of the end retainer. Thus, proper positioning of the ear and the link during assembly of the valve readily enables achievement of this desirable feature.

In FIG. 7, a different configuration of the link is illustrated. Specifically, a link 55 is of generally Y-shaped configuration as contrasted with the H-shaped configuration of link 45. To accommodate the single leg of the Y, the end of operating rod 41 comprises a clevis portion 57 which is suitably journalled to accept cylindrical pin 47 therethrough. The advantage of this construction is that the clevis arrangement provides a shoulder which may be conveniently used to prevent unintended exit of the operating rod from the stem of the valve in the event of failure of the link or pin under high pressure conditions.

Accordingly, what has been described is a novel throttling valve capable of use in high pressure bidirectional flowpaths, which is simple in construction and economical to manufacture.

It is recognized that numerous modifications and changes in the described embodiment of the invention will occur to those skilled in the art without departing from its true spirit and scope. The invention is to be limited only as defined in the claims.

What is claimed is:

1. A throttling valve having an ON and an OFF position adapted for use in a high pressure bidirectional flowpath comprising:

a cylindrical valve body defining a cavity;

a pair of circular end retainers, each defining at least one port, positioned at opposite ends of said cavity with said ports in alignment, and each having a flat inner surface;

a rotatably mounted disc, having oppositely disposed flat surfaces, defining at least one substantially similar shaped port, positioned for rotational movement between said end retainers for varying the relationship between the port of said disc and the ports in said end retainers to control the flow in said flowpath between said OFF and said ON positions, the thickness of said rotatable disc being less than the thickness of either end retainer to assure that the disc flexes more than said end retainers for equal amounts of pressure and the thickness of said rotatable disc being less than the distance between said end retainers to provide for lateral movement of said rotatable disc therebetween;

an operating rod movably mounted in said body;

link means coupled between said operating rod and said rotatable disc for translating linear movement of said operating rod into rotational movement of said disc, said operating rod and said link means being located outside said flowpath; and bearing shaft means for supporting said disc for rotational movement and for permitting slight lateral movement thereof in the direction of said flowpath, said flat inner surfaces of said end retainers and the corresponding surface of said rotatable disc cooperating, under the force of fluid pressure, to seal said flowpath when said valve is in said OFF position, said end retainers extending beyond the confines of said body to facilitate installation of said valve in a pipeline exerting clamping pressure on said end retainers.

2. The valve of claim 1 wherein said end retainers are removably mounted in said body and wherein said disc, said link means and said operating means are removable to facilitate service and maintenance of said valve.

3. The valve of claim 1 wherein said ports in said end retainers are tapered outwardly and wherein said ports in said end retainers and said port in said disc form sharp edges with said surfaces, respectively, to enhance the cleaning of said surfaces during rotation of said disc.

* * * * *